(12) United States Patent
Kan

(10) Patent No.: US 9,857,951 B2
(45) Date of Patent: *Jan. 2, 2018

(54) FILE-CENTRIC FORM SELECTION BASED ON NUMBER OF MANDATORY AND OPTIONAL INPUT FIELDS OF A FORM SATISFIED BY A SELECTION OF FILES

(71) Applicant: International Business Machines Corporation, Armonk, NY (US)

(72) Inventor: Kevin C. Y. Kan, North York (CA)

(73) Assignee: International Business Machines Corporation, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/844,304

(22) Filed: Sep. 3, 2015

(65) Prior Publication Data

US 2016/0328122 A1     Nov. 10, 2016

Related U.S. Application Data

(63) Continuation of application No. 14/705,212, filed on May 6, 2015, now Pat. No. 9,696,890.

(51) Int. Cl.
*G06F 17/24* (2006.01)
*G06F 17/30* (2006.01)
(Continued)

(52) U.S. Cl.
CPC ........ *G06F 3/04842* (2013.01); *G06F 3/0482* (2013.01); *G06F 3/04817* (2013.01); *G06F 17/243* (2013.01); *G06F 17/30126* (2013.01)

(58) Field of Classification Search
CPC .................................................. G06F 17/243
See application file for complete search history.

(56) References Cited

U.S. PATENT DOCUMENTS 7,069,538 B1    6/2006   Renshaw
7,191,391 B2    3/2007   Takashima
(Continued)

FOREIGN PATENT DOCUMENTS

EP          1019848 B1    11/2004
WO      2010050927 A1     5/2010

OTHER PUBLICATIONS

Bharath, "Add or Remove Items From Windows Context Menu", May 17, 2010, retrieved from http://techrena.net/remove-customize-items-windcms-context-menu/ on Jan. 20, 2017.*

(Continued)

*Primary Examiner* — Cesar Paula
*Assistant Examiner* — Konrad Kulikowski
(74) *Attorney, Agent, or Firm* — James H. Mayfield

(57) ABSTRACT

A method, executed by a computer, for file-centric form selection includes receiving a selection of files from a user, determining a relevance value for each form, and presenting the forms to a user in order of relevance value. Once a particular form is selected, a reference to each file may be automatically placed into the form's appropriate input fields. A user may also input non-file information into the form. In certain embodiments, the relevance value is determined by a history of use of the form by the user or by other users. In some embodiments, the relevance value is determined according to the percentage of the form's input fields completed by using the files as input. A computer program product and computer system corresponding to the method are also disclosed herein.

8 Claims, 5 Drawing Sheets

(51) Int. Cl.
*G06F 3/0484* (2013.01)
*G06F 3/0481* (2013.01)
*G06F 3/0482* (2013.01)

(56) References Cited

U.S. PATENT DOCUMENTS

| | | | |
|---|---|---|---|
| 7,203,737 | B2 | 4/2007 | Starbuck et al. |
| 7,216,292 | B1 | 5/2007 | Snapper et al. |
| 7,805,669 | B2 | 9/2010 | Sattler et al. |
| 8,402,047 | B1 | 3/2013 | Mangini et al. |
| 8,595,230 | B1 | 11/2013 | Djabarov |
| 8,600,931 | B1 | 12/2013 | Wehrle et al. |
| 8,799,762 | B1 | 8/2014 | Wang et al. |
| 2011/0202583 | A1 | 8/2011 | Provencher et al. |
| 2013/0346854 | A1 | 12/2013 | Geithner |
| 2014/0122989 | A1 | 5/2014 | Eigner et al. |
| 2014/0195888 | A1 | 7/2014 | Alford, Jr. et al. |
| 2014/0344247 | A1* | 11/2014 | Procopio ............ G06F 9/44505 707/722 |

OTHER PUBLICATIONS

Tim Huff, "Creating PDFs from AutoCAD DWG files without AutoCAD", May 16, 2008, retrieved from https:/lacrobatusers.com/tutorials/creating-pdfs-auttocad-dwg-files-without-autocad on Jan. 20, 2017.*

Kan, Kevin, C.Y., "File-Centric Form Selection", U.S. Appl. No. 15/599,501, filed May 19, 2017, 27 pages.

IBM Appendix P, list of patents or patent applications treated as related, filed herewith, 2 pages.

IBM Appendix P, list of IBM patents or patent applications to be treated as related, Sep. 3, 2015, pp. 1-2.

"File input (or "upload") in HTML forms", Date of creation: 1999 (?), Last revision: Nov. 13, 2004, Last modification: Jan. 13, 2012, pp. 1-13, <http://www.cs.tut.fi/~jkorpela/forms/file.html>.

Kan, "File-Centric Form Selection", U.S. Appl. No. 14/705,212, filed May 6, 2015, pp. 1-27.

* cited by examiner

FIG. 4

FILE-CENTRIC FORM SELECTION BASED ON NUMBER OF MANDATORY AND OPTIONAL INPUT FIELDS OF A FORM SATISFIED BY A SELECTION OF FILES

THE INVENTION

The present invention relates generally to information processing and, more specifically, to user completion of forms used for information processing.

Forms are often used as a convenient mechanism to collect data for information processing. For example, a form may have a field in which a user can supply raw data for analysis, a field to specify the number of CPUs to dedicate to data processing, or a field to specify the desired format of any output files. Users who perform many different types of data analysis can become overwhelmed at the sheer number of forms available for selection.

SUMMARY

As disclosed herein, a method, executed by a computer, for file-centric form selection includes selecting files, determining a relevance value for each form, and presenting the forms to a user in order of relevance value. Once a particular form is selected, a reference to each file such as a filename may be automatically placed into the form's appropriate input fields. A user may also input non-file information into the form. In certain embodiments, the relevance value is determined by the frequency of use of the form by the user, the time of last use of the form by the user, or the frequency of use of the form by other users. The relevance value may also be determined by the historical association of the selected files with each form. In some embodiments, the relevance value is determined according to the percentage of a form's input fields completed by using the files as input. A computer program product and computer system corresponding to the method are also disclosed herein.

BRIEF DESCRIPTION OF THE DRAWINGS

FIG. 4 is a user interface diagram depicting one example of form selection in accordance with the present invention.

DETAILED DESCRIPTION

Embodiments of the present invention enable user completion of forms that accept files as input. A user may be presented with forms that are relevant to the user's particular endeavor in response to files that the user has referenced. In this manner, the user may not need to sort through undesired forms, as file-centric form selection has already filtered out forms that are incompatible with the user's set of files. Thus, the user may be presented with a list of forms that is tailored toward the user's current task.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
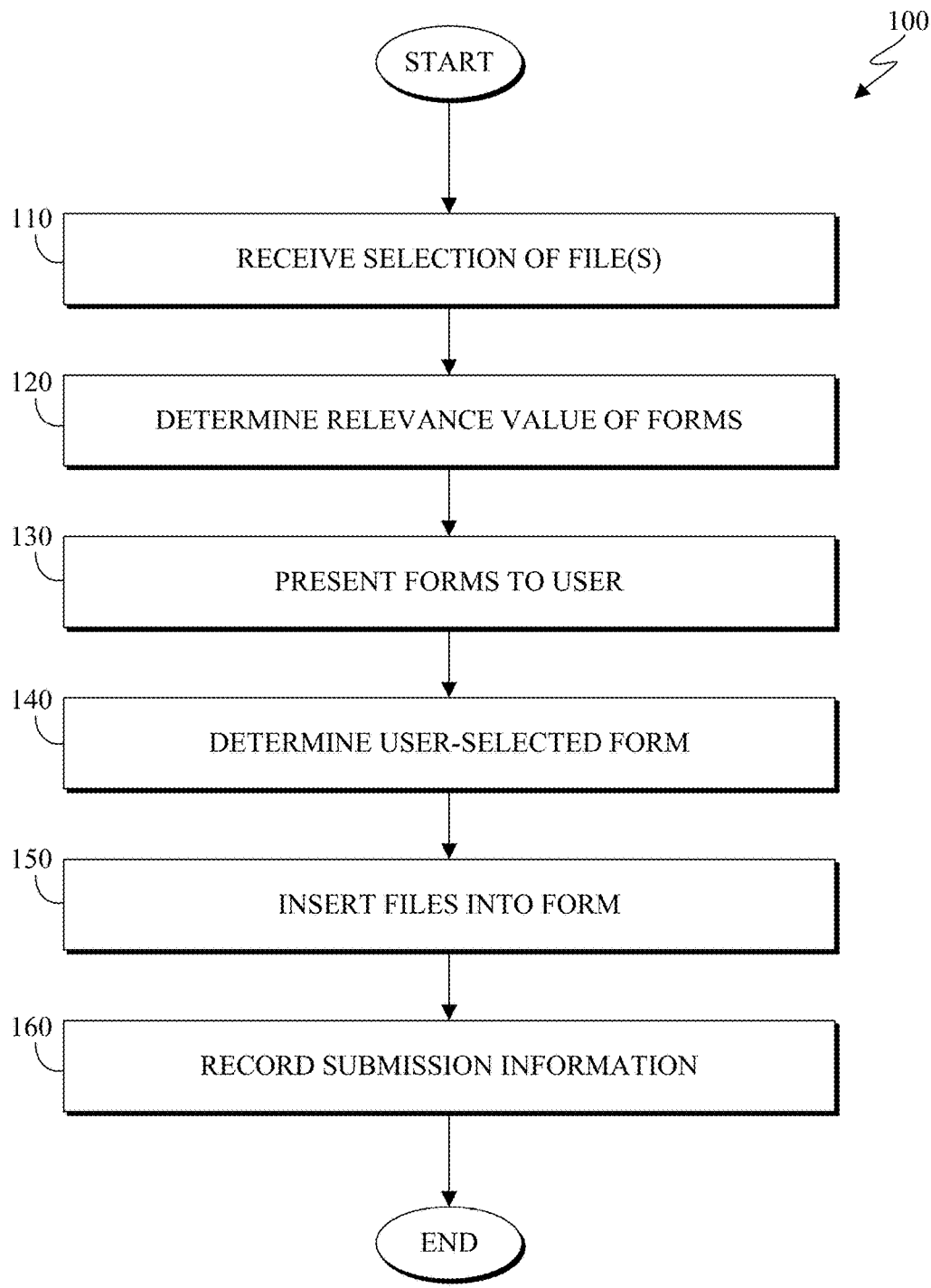
FIG. 1 is a flowchart of one embodiment of a method for form selection in accordance with the present invention.

FIG. 1 is a flowchart of one embodiment of a form selection method 100 in accordance with the present invention. As depicted, the form selection method 100 includes receiving (110) a selection of files, determining (120) relevance, presenting (130) forms to the user, determining (140) the user-selected form, inserting (150) files into the form, and recording (160) submission information. The form selection method 100 may facilitate a user selecting the correct form for the user's files, since the method filters forms by relevance.

Receiving (110) a selection of files may include a user choosing one or more files for processing. In certain embodiments, the user selects the files via a user interface such as a file browser, shell, command line interpreter, or the like. Once the user designates a set of files, the computer or server that is executing this method is informed of the user's selection(s). The files may be stored locally, remotely, or a combination of both.

Determining (120) the relevance value of forms may include analyzing the available forms to determine which form(s) correspond to the selected set of files, as well as how relevant each form is to the files. The relevance value may be a binary "relevant" or "not relevant" datum, or an arbitrary value measured as a percentage or degree of relevance. The relevance of a form may be determined by measuring the strength of the relationship between the files and each form. In some embodiments, the relevance of a form is determined by a user's history. For example, forms that have been submitted more recently by a user may be ranked higher in relevance. Similarly, the number of times that a user has submitted a form may be positively correlated to relevance. In certain embodiments, the relevance value of a form is determined by the number of times that users other than the current user (e.g. the user's peers) have submitted the form.

The relevance value of a particular form may also be determined by the tendency of a user to use a particular set of files with that particular form. For example, if files A, B, and C were previously used with form F, then selecting files A, B, and C in the future may increase the relevance value of form F. In calculating a form's relevance, a set of files may not necessarily be the exact set that was used with the form as long as the files are similar. In certain embodiments, files are considered similar if they share a similar file name, file type, size, content, or metadata.

In some embodiments, the relevance value of a particular form is determined by measuring the percentage of a form's file selection fields that are populated by the user's selected files. This percentage may be referred to as "mandatory field completion" count when only the mandatory fields are measured for completion, and "total field completion" count when both mandatory and optional fields are factored in. For example, if form F has five blank fields and form G has four, and a user selects three files that can populate any of either form's fields, then form G may be more relevant since its fields are 75% populated compared to 60% for form F. In certain embodiments having both mandatory and optional selection fields, the percentage of populated mandatory file selection fields is weighed more heavily than the percentage of populated optional file selection fields.

Presenting (130) the forms to the user may include returning a list of forms which are relevant given the set of files that has been selected. The forms may be presented in order of relevance value, e.g., as a list of forms increasing or decreasing by relevance. In some embodiments, only the forms most relevant are presented to the user. Furthermore, if a form does not accept any of the files in the user's selection, then that form may be omitted from the form presentation operation 130.

Determining (140) the user-selected form may include receiving notification of the user's selection of a particular form. In certain embodiments, this occurs in response to the user choosing one form out of the forms that have been presented at the form presentation operation 130. The particular form may be the form which the user desires to complete using the user's set of files.

Inserting (150) files into the forms may include placing each selected file into the appropriate file selection field. In certain embodiments, files are placed automatically into a field that supports the file type. For example, if the set of files contains one PDF and the form has one PDF file selection field, then the PDF file may be automatically inserted into the form's PDF file selection field. In another example there are two PDF files and two PDF file selection fields. In such a case, a file that is the same as (or similar to) a file previously submitted to the form may be automatically placed in the same file selection field in which it was placed previously. If there is no user history that associates the selected files with the form, then files may be inserted into file selection fields by matching the order in which the files were selected with the order in which the file selection fields appear in the form.

Recording (160) the submission information may include logging any information relating to the user's decisions and selections of files and forms that can be used to ascertain the relevance value between forms and files. In some embodiments, the submission information includes which files the user submitted into a given form, and in which of the form's fields the user inputted the files. The submission information may be stored in such a manner that it can be used in the future during any of the steps of the form selection method 100.

Figure 2:
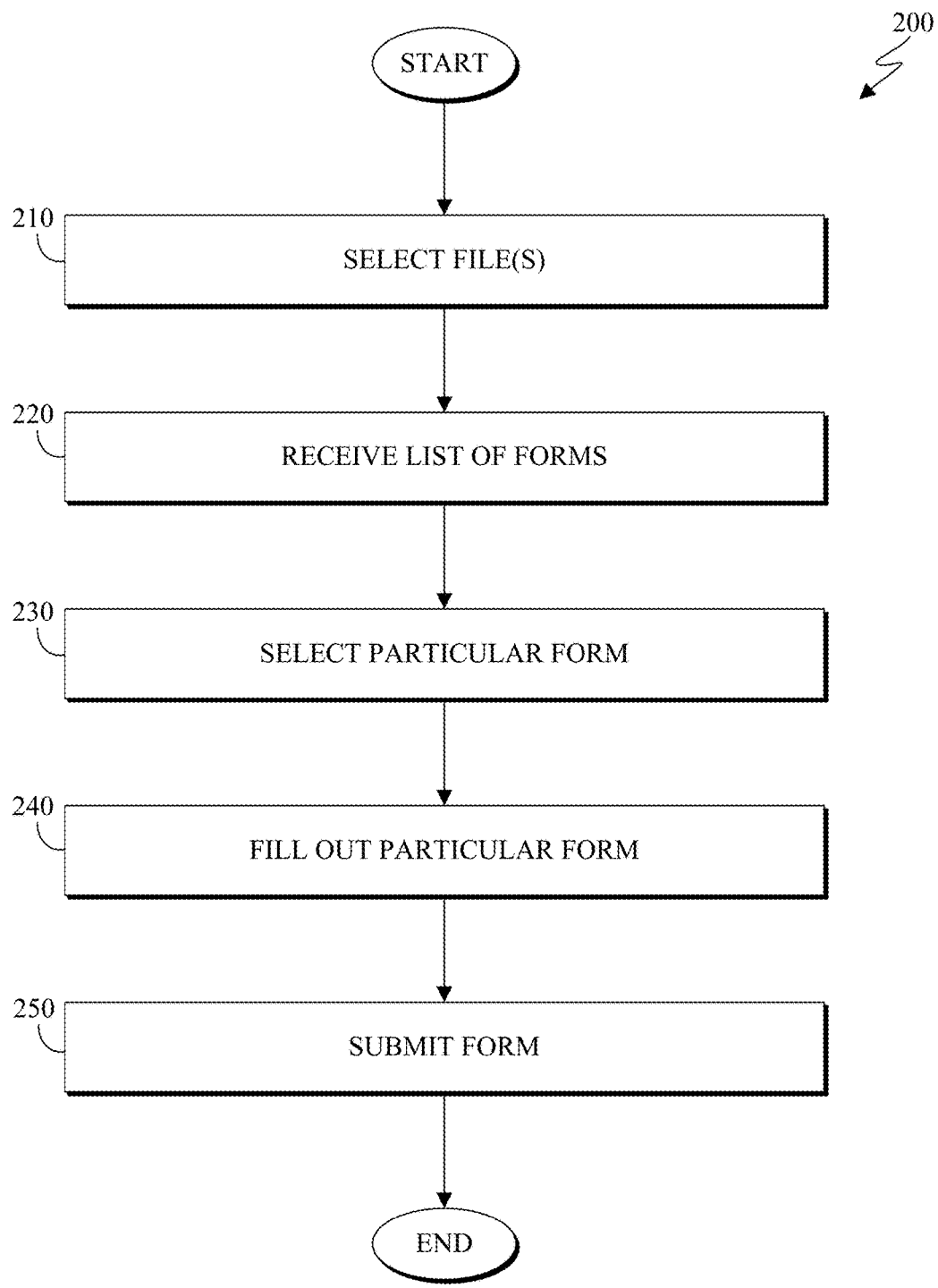
FIG. 2 is a flowchart of one embodiment of a method for form selection in accordance with the present invention.

FIG. 2 is a flowchart of one embodiment of a form selection method 200 in accordance with the present invention. As depicted, the form selection method 200 includes selecting (210) files, receiving (220) a list of forms, selecting (230) a form, filling out (240) the form, and submitting (250) the form. The form selection method 200 may be executed by a user.

Selecting (210) files may include a user accessing files and indicating which files the user intends to submit to a form. The files may be stored in databases or directories that are local or remote from the user's perspective. In some embodiments, a graphical user interface enables a user to browse through files and indicate a selection by clicking on each file, selecting checkboxes or radio buttons adjacent to the files, or the like.

Receiving (220) a list of forms may include presenting the forms to the user based on the user's file selection. In some embodiments, this list is automatically filtered and/or ranked by each form's relevance value. Once a user receives a list of forms, the user may select a form in particular. Selecting (230) a particular form may include the user indicating the form with which the user desires to process the set of files. If the user changes the user's file selection, e.g., by selecting or deselecting files, the list of forms may change due to the forms' relevance values changing.

Filling out (240) the particular form may include inserting the files into the correct file selection fields in the form. In some embodiments, the files may be automatically placed into the correct fields. The user may wish to double-check any portions of the forms filled out automatically to ensure accuracy. In addition to the file selection fields, the form may also contain non-file fields that the user can fill out. Such non-file fields may include names, dates, form output preferences, or any other non-file information that a form might require. Submitting (250) the form may include completing the form and sending it to a computer for processing. In certain embodiments, the computer may be local or remote, or the form's processing may be parallelized across multiple computers. The user may also be notified immediately prior to form submission that the form's mandatory and/or optional requirements are fulfilled.

Figure 3A:
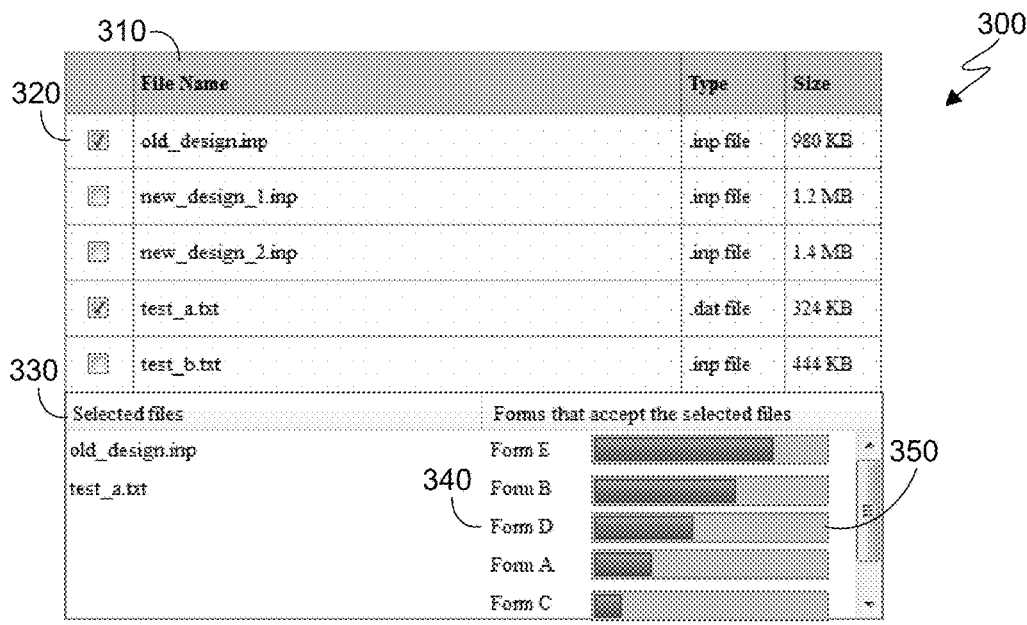
FIGS. 3A and 3B are user interface diagrams depicting one example of form selection in accordance with the present invention.
Figure 3B:
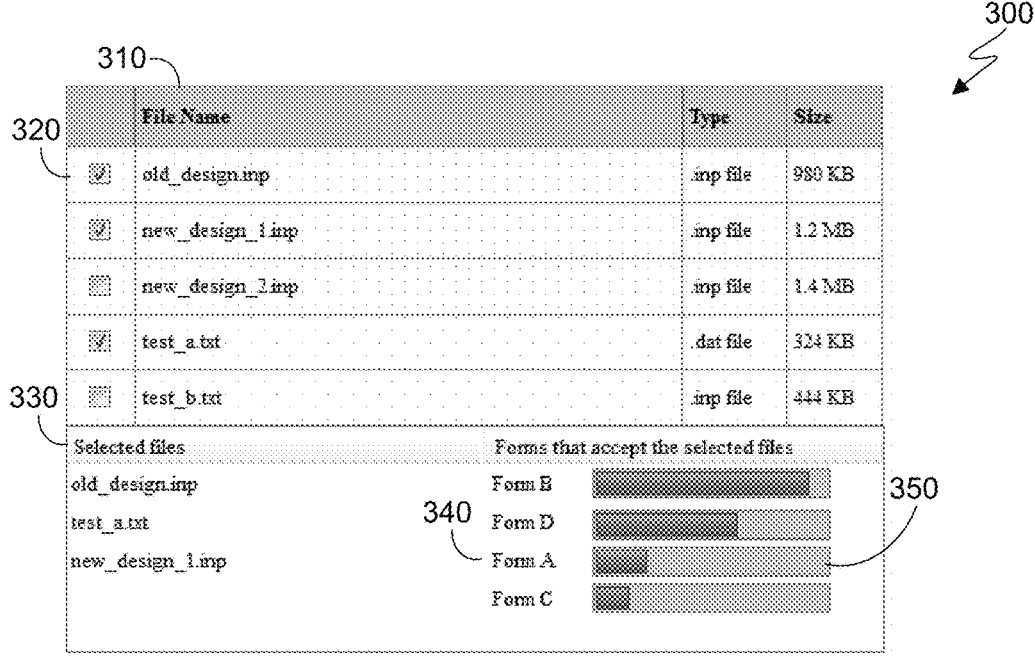

FIGS. 3A and 3B are user interface diagrams depicting examples of a form selection interface 300 in accordance with the present invention. As depicted, the form selection interface 300 includes files 310, selection indicators 320, selected files listing 330, form listing 340, and form relevance indicator 350. FIG. 3A depicts an embodiment with two files selected, and FIG. 3B shows the resulting form selection interface 300 upon selecting an additional file.

The files 310 may include any data files that are suitable for submission to a form. The files 310 may contain raw data, program instructions, media, or any other information of the like, including forms. The selection indicators 320 may indicate to a user which files are or are not selected. In certain embodiments, the selection indicators 320 may be toggled between "checked" and "unchecked" by a user clicking on the indicator 320 or its associated file 310.

The selected files listing 330 may include a list of files 310 that are selected for submission to a form. In some embodiments, files 310 are selected by dragging-and-dropping the files 310 into the selected files listing 330. Similarly, the files 310 appearing in the selected files listing 330 may be de-selected by dragging-and-dropping the files 310 out from the selected files listing 330.

The form listing 340 may include a list of forms that are available. In some embodiments, the forms appear in order of their relevance values. The form relevance 350 may indicate the degree of relevance of each form. For example, based on the selection of old_design.inp and test_a.txt, Form E may be the most relevant form. However, changing the set of files may change the forms' relevance values and thus affect form listing 340 and form relevance 350. In FIG. 3B, for example, another file, new_design_1.inp, has been added to the selection. In the depicted embodiment, this caused Form B's relevance value to increase, as indicated by the form relevance 350 bar increasing. Additionally, in this example Form E is depicted as dropping out of relevance altogether, which may have been because the files listing 330 now has two INP files, and Form E may not have two INP file selection fields.

Figure 4:
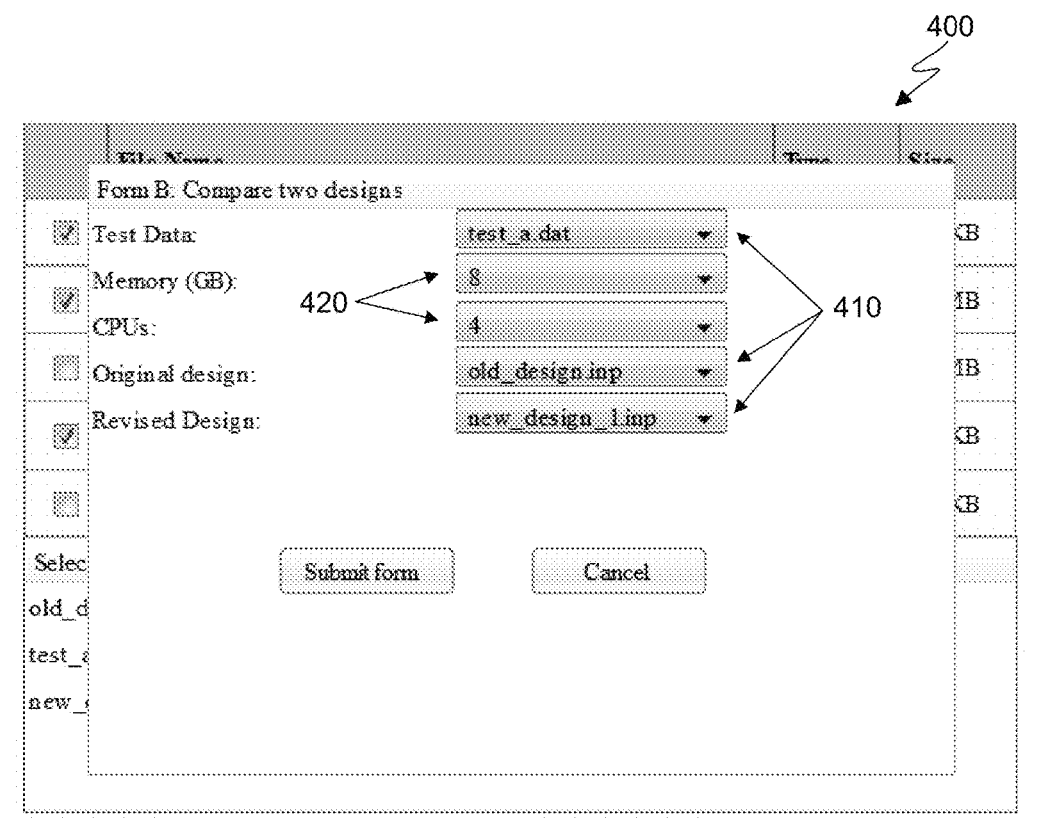

FIG. 4 is a user interface diagram depicting one example of a form submission interface 400 in accordance with the present invention. As depicted, the form submission interface 400 includes file selection fields 410 and non-file selection fields 420. The form submission interface 400 is shown only after a particular form is selected from the form listing 340.

The file selection fields 410 may include selection fields that accept files 310 as input. In some embodiments, the file selection fields 410 are pull-down menus that a user may click to reveal other files 310 that are available to the form. The file selection fields 410 may be populated automatically with files 310. The non-file selection fields 420 may accept a type of input that is not a file 310. In the depicted embodiment, the non-file form selection fields 420 enable a user to specify the amount of memory and number of CPUs to dedicate to processing the form. In other embodiments, the non-file form selection fields 420 may include name fields, time/date fields, file type output fields, or any other sort of qualitative or quantitative information that is not a file 310. Once a user completes the fields in the form submission interface 400, the user may submit the form.

Figure 5:
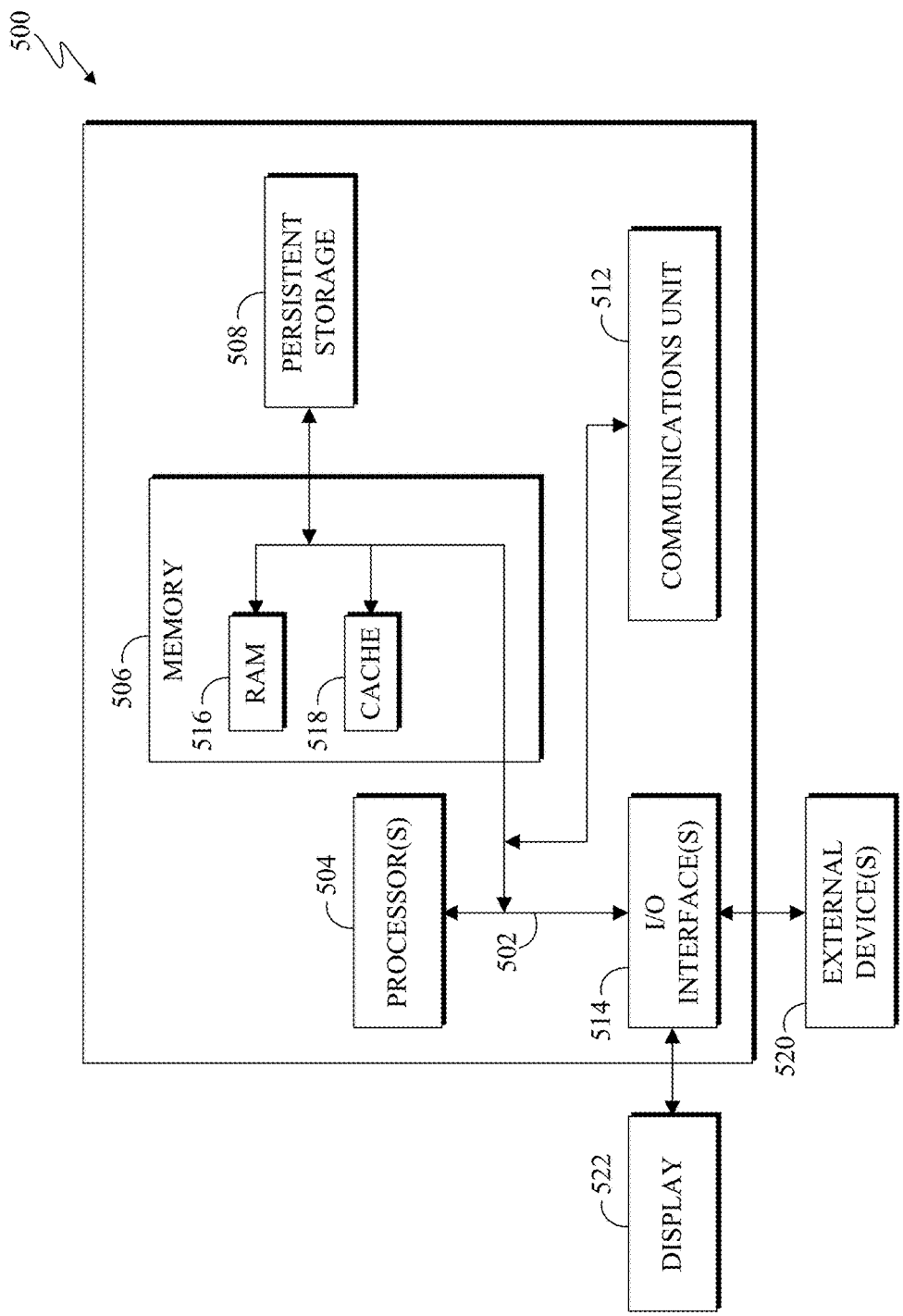
FIG. 5 is a block diagram depicting one example of a computing apparatus (i.e., computer) suitable for executing the methods disclosed herein.

FIG. 5 is a block diagram depicting one example of a computing apparatus (i.e., computer) suitable for executing the methods disclosed herein.

The foregoing methods enable file-centric form selection. FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for form selection, the method comprising:
receiving a selection of electronic computer files from a user;
determining a list of available forms, each form in the list of available forms having input fields, wherein at least one of the input fields of each form accepts at least one file as an input, and wherein each input field is designated as a mandatory or an optional input field for each form;
filtering the list of available forms into a list of relevant forms, wherein the list of relevant forms includes only forms that include one or more input fields that accept as input at least one file from the selection of electronic computer files;
determining a relevance value for each form in the list of relevant forms, wherein the relevance value is determined according to a count of the number of mandatory input fields and optional input fields on each form that are able to be completed using the selection of electronic computer files as input to the input fields and
presenting the list of relevant forms to a user in order of the relevance value determined for each form.

2. The method of claim 1, further comprising:
updating the selection of files; and
responsive to updating the selection of files, updating the relevance value for each form in the list of relevant.

3. The method of claim 1, further comprising selecting a particular form and inserting each file of the selection of files automatically into the corresponding input field on the particular form.

4. The method of claim 1, further comprising enabling the user to select a particular form and to input non-file information into the particular form.

5. The method of claim 1, wherein the relevance value is further determined by the group of criteria consisting of frequency of use of the form by the user, time of last use of the form by the user, and frequency of use of the form by other users.

6. The method of claim 1, wherein the relevance value is further determined by a historical association of the selection of files with the one or more forms.

7. The method of claim 1, wherein the relevance value corresponds to a mandatory field completion count for the form.

8. The method of claim 1, wherein the relevance value corresponds to a total field completion count for the form.

\* \* \* \* \*